US009692793B2

(12) United States Patent
Lau et al.

(10) Patent No.: US 9,692,793 B2
(45) Date of Patent: Jun. 27, 2017

(54) COMMUNICATION SESSION ALLOCATION

(75) Inventors: Priscilla Lau, Fremont, CA (US);
Mingxing Li, San Jose, CA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 204 days.

(21) Appl. No.: 13/184,834

(22) Filed: Jul. 18, 2011

(65) Prior Publication Data

US 2013/0024574 A1 Jan. 24, 2013

(51) Int. Cl.
*H04L 29/06* (2006.01)
*H04W 48/18* (2009.01)
*H04W 60/00* (2009.01)
*H04W 76/02* (2009.01)
*H04W 88/06* (2009.01)
*H04W 48/16* (2009.01)

(52) U.S. Cl.
CPC ...... *H04L 65/1069* (2013.01); *H04L 65/1073* (2013.01); *H04L 65/1083* (2013.01); *H04W 48/18* (2013.01); *H04W 60/00* (2013.01); *H04W 76/026* (2013.01); *H04W 48/16* (2013.01); *H04W 88/06* (2013.01)

(58) Field of Classification Search
USPC ......................................................... 709/239
See application file for complete search history.

(56) References Cited

U.S. PATENT DOCUMENTS 5,163,156 A * 11/1992 Leung et al. ................. 709/215
7,403,517 B2 * 7/2008 Westman ...................... 370/352
2004/0136324 A1 * 7/2004 Steinberg et al. ............ 370/238
2006/0083193 A1 * 4/2006 Womack et al. .............. 370/328
2006/0105766 A1 * 5/2006 Azada et al. ............... 455/432.1
2006/0245392 A1 * 11/2006 Buckley et al. .............. 370/331
2006/0286980 A1 * 12/2006 Hua .......................... 455/435.1
2007/0189279 A1 * 8/2007 Thalanany et al. .......... 370/356
2007/0238467 A1 * 10/2007 Buckley et al. .............. 455/445
2008/0175253 A1 * 7/2008 Rahman et al. .......... 370/395.52
2009/0055899 A1 * 2/2009 Deshpande et al. ............. 726/4
(Continued)

OTHER PUBLICATIONS

Kenichi Taniuchi, Yoshihiro Ohba, Victor Fajardo, Subir Das, Miriam Tauil, Yuu-Heng Cheng, Ashutosh Dutta, Donald Baker, Maya Yajnik, and David Famolari. "IEEE 802.21: Media Independent Handover: Features, Applicability, and Realization." Published in "IEEE Communication Magazine", Jan. 2009. pp. 112-120.*

(Continued)

*Primary Examiner* — Oscar Louie
*Assistant Examiner* — Benjamin A Jenkins

(57) ABSTRACT

A network device may receive an incoming call for a user device requesting a communication session corresponding to a particular communication session type, where the user device is attached to a first access network. The network device may identify the first access network and determine whether a first centralized network supports the communication session type in the first access network. When the first centralized network supports the communication session type in the first access network, the network device may designate the first centralized network to service the incoming call. When the first centralized network does not support the communication session type in the first access network, the network device may designate a second centralized network to service the incoming call.

18 Claims, 10 Drawing Sheets

(56) References Cited

U.S. PATENT DOCUMENTS

2009/0103455 A1* 4/2009 Balasubramanian
et al. .............................. 370/254
2010/0232368 A1* 9/2010 Bogner et al. ................ 370/329
2010/0329243 A1* 12/2010 Buckley et al. .............. 370/352

OTHER PUBLICATIONS

Author unknown. "type, n." OED 2nd Edition, Oxford University Press, 1989. 10 pages.*
Author unknown. "The Authoritative Dictionary of IEEE Standards Terms: Seventh Edition". Published by IEEE Press, Dec. 2000. "N" section: pp. 720-751.*
3rd Generation Partnership Project. "Technical Specification Group Services and System Aspects; Network Sharing; Architecture and functional description". TS 23.251 v9.2.0; Mar. 2010. 20 pages.*
3rd Generation Partnership Project. "Technical Specification Group Services and Architecture; Feasibility Study on Multimedia Session Continuity; Stage 2 (Release 8)." TR 23.893 v8.0.0; Jun. 2008. 62 pages.*

* cited by examiner

USER DEVICE REGISTRATION DIRECTORY

| USER DEVICE IDENTIFIER | REGISTRATION STATUS |
|---|---|
| DEVICE ID-1 | YES |
| DEVICE ID-2 | YES |
| DEVICE ID-3 | YES |
| DEVICE ID-4 | YES |
| ... | ... |

USER DEVICE AND ACCESS NETWORK DIRECTORY

| USER DEVICE IDENTIFIER | ACCESS NETWORK IDENTIFIER |
|---|---|
| DEVICE ID-1 | NETWORK ID-1 |
| DEVICE ID-2 | NETWORK ID-1 |
| DEVICE ID-3 | NETWORK ID-2 |
| DEVICE ID-4 | NETWORK ID-2 |
| ... | ... |

USER DEVICE REGISTRATION DIRECTORY

| USER DEVICE IDENTIFIER | REGISTRATION STATUS |
|---|---|
| DEVICE ID-1 | YES |
| DEVICE ID-2 | YES |
| DEVICE ID-3 | YES |
| DEVICE ID-4 | YES |
| ... | ... |

USER DEVICE AND ACCESS NETWORK DIRECTORY

| USER DEVICE IDENTIFIER | ACCESS NETWORK IDENTIFIER |
|---|---|
| DEVICE ID-1 | NETWORK ID-1 |
| DEVICE ID-2 | NETWORK ID-1 |
| DEVICE ID-3 | NETWORK ID-2 |
| DEVICE ID-4 | NETWORK ID-2 |
| ... | ... |

ACCESS NETWORK SERVICES DIRECTORY

| ACCESS NETWORK IDENTIFIER | SESSION TYPE | SUPPORTED? |
|---|---|---|
| NETWORK ID-1 | VoIP | YES |
| NETWORK ID-1 | SMS | YES |
| ... | ... | ... |
| NETWORK ID-2 | VoIP | NO |
| NETWORK ID-2 | SMS | YES |
| ... | ... | ... |

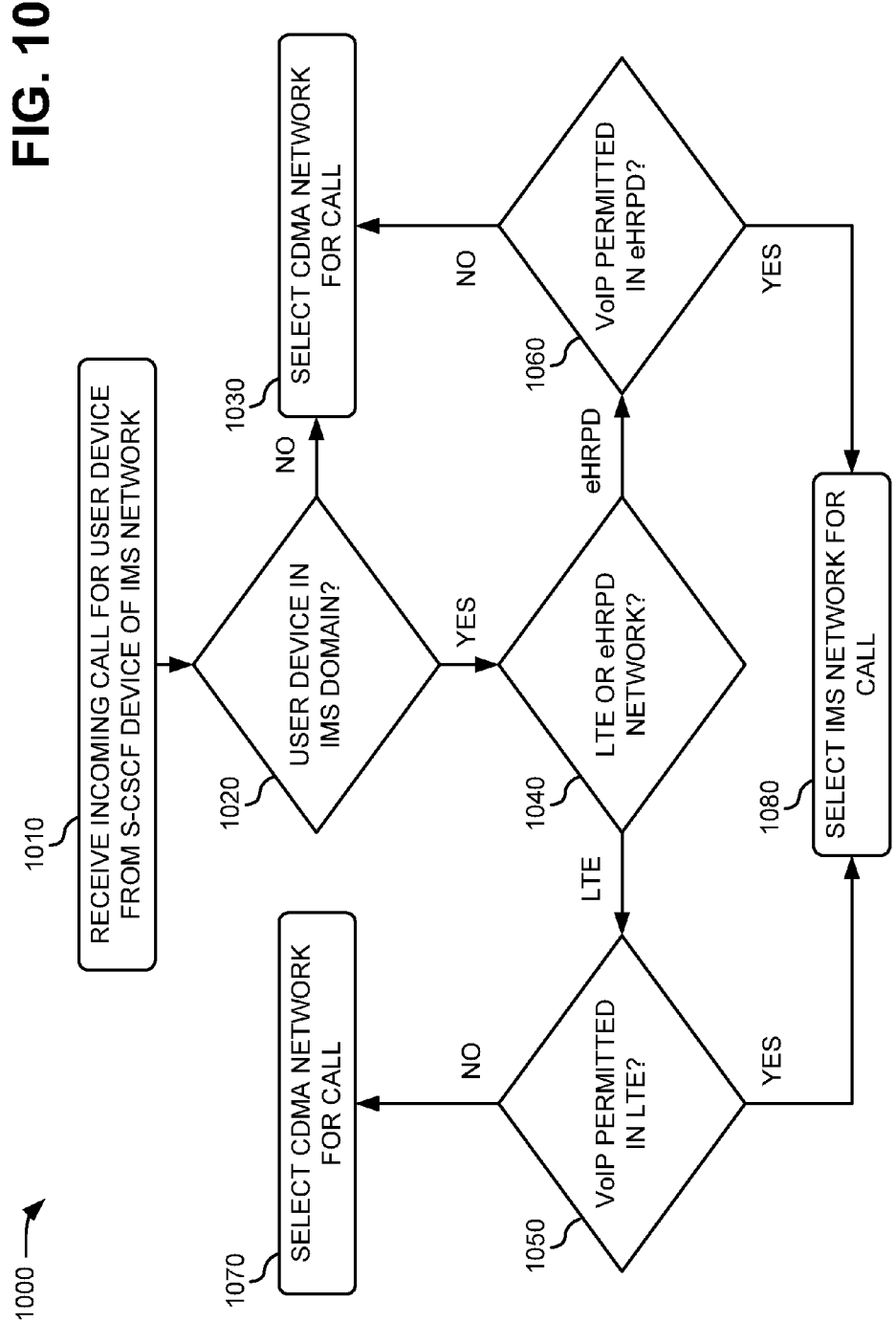

COMMUNICATION SESSION ALLOCATION

BACKGROUND

Currently available network technologies can enable user devices to communicate with one another using a variety of communication services, such as cellular services, voice over Internet Protocol (voice over IP, VoIP) services, short messaging service (SMS), instant messaging (IM) services, and other types of communication services. However, currently available networking technologies are limited in a number ways. For example, networks are often limited by an inability to allocate communication sessions (e.g., call sessions) to different networks.

BRIEF DESCRIPTION OF THE DRAWINGS

FIG. 6 is a diagram representing example data structures according to one or more implementations described herein;

FIGS. 9A-9C are diagrams representing example data structures according to one or more implementations described herein; and FIG. 10 is a diagram of another example process for allocating a communication session according to one or more implementations described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to allocate communication sessions to different networks. For example, a session allocation device may receive a session initiation message associated with a user device connected to an access network. The session initiation message may correspond to a communication session type, such as a VoIP communication session. The session allocation device may select a network from a group of networks to service the corresponding communication session based on one or more factors, such as whether the user device is registered with a particular network, whether the communication session type is permitted by the particular network, or other criteria relating to communication services.

Figure 1:
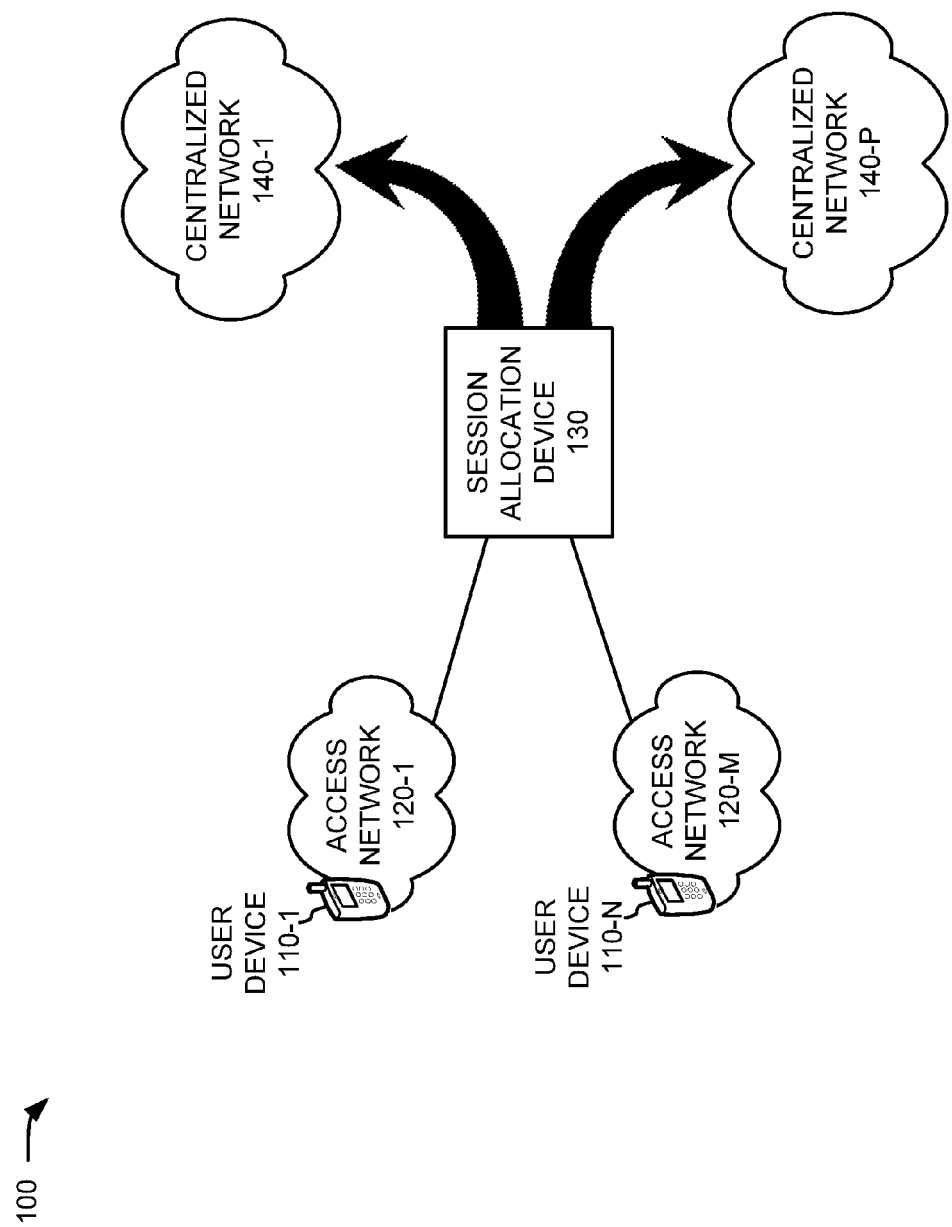
FIG. 1 is a diagram of an example overview of an implementation described herein.

FIG. 1 is a diagram of an example overview 100 of an implementation described herein. As depicted, overview 100 may include user devices 110-1, . . . , 110-N (where N≥1) (collectively referred to as "user devices 110," and individually as "user device 110"), access networks 120-1, . . . , 120-M (where M≥1) (collectively referred to as "access networks 120," and individually as "access network 120"), session allocation device 130, and centralized networks 140-1, . . . , 140-P (where P≥1) (collectively referred to as "centralized networks 140," and individually as "centralized network 140"). In some implementations, the systems and devices of FIG. 1 may correspond to one or more systems or devices discussed elsewhere in this specification.

User device 110 may include one or more of a variety of devices capable of network communications. For example, user device 110 may include a telephone, a smart phone, a laptop computer, a tablet computer, a desktop computer, or another type of computing or communication device. In some implementations, user device 110 may be capable of connecting to one or more access networks 120 corresponding to different access technologies (e.g., different wireless protocols and/or standards).

Access network 120 may include any type of network or combination of networks. For example, access network 120 may include a local area network (LAN) (e.g., an Ethernet network), a wireless LAN (WLAN) (e.g., an IEEE 802.11x network), a wide area network (WAN) (e.g., the Internet), or a wireless WAN (WWAN) (e.g., a Long-Term Evolution (LTE) network, a High-Speed Packet Access (HSPA) network, an Evolved High Rate Packet Data (eHRPD) network, etc). Access network 120 may also, or alternatively, include a fiber optic (e.g., a fiber optic service (FiOS)) network, a metropolitan area network (MAN), an ad hoc network, or a telephone network (e.g., a Public Switched Telephone Network (PSTN)). In some implementations, access network 120 may be capable of enabling user devices 110 to communicate with, or otherwise obtain services from, centralized networks 140. User device 110 may have access to one or multiple access network 120 at the same time such that user device 110 may be able to receive services from one or more than one centralized network 140.

Session allocation device 130 may include one or more of a variety of computing devices. For example, session allocation device 130 may include a computer, a server, a cluster of servers, or one or more other types of computing or communication devices. In some implementations, session allocation device 130 may be part of one or more centralized networks 140. For instance, session allocation device 130 may be implemented as an application server (e.g., a telephone application server (TAS) or a Call Session Control Function (CSCF)) operating in centralized network 140.

Similar to access network 120, centralized network 140 may include any type of network or combination of networks. For instance, centralized network 140 may include a LAN, a WLAN, a WAN, or a WWAN. Centralized network 140 may include a fiber optic network, a MAN, an ad hoc network, a telephone network, or a VoIP network. Centralized network 140 may be capable of providing a variety of communication network services, such as registration services, authentication services, authorization services, call session control services, and other types of communication services. In some implementations, centralized network 140 may include an IP multimedia subsystem (IMS) network, a code division multiple access (CDMA) network, or another type of network capable of a servicing communication sessions. In some implementations, centralized networks 140 may include a next generation network (NGN) (e.g., an IMS network) and a legacy network (e.g., a CDMA network or other type of network based on technology predating a type of technology upon which the NGN may be based).

Session allocation device 130 may receive a registration message corresponding to user device 110 registering with one of centralized networks 140. Session allocation device 130 may identify which access network 120 user device 110 has connected to based on the registration message and create a data structure associating user device 110 with access network 120. If user device 110 later connects to another access network 120, user device 110 may re-register with centralized network 140, and session allocation device 130 may update the data structure associating user device 110 with access network 120, accordingly.

Session allocation device 130 may also, or alternatively, receive a session initiation message associated with user device 110. A session initiation message may include a variety of formatted data structures, including a session initiation protocol (SIP) message. The session initiation message may correspond to a communication session type, such as a VoIP communication session. Session allocation device 130 may select one of centralized networks 140 to service the session initiation request depending on one or more of a variety of factors. Examples of such factors may include whether user device 110 has registered with a particular centralized network 140, whether a centralized network 140 are capable or permitted to support the communication session type, one or more preferences of an operator of a centralized network 140, or one or more of a variety of other factors relating to communication services.

Figure 2:
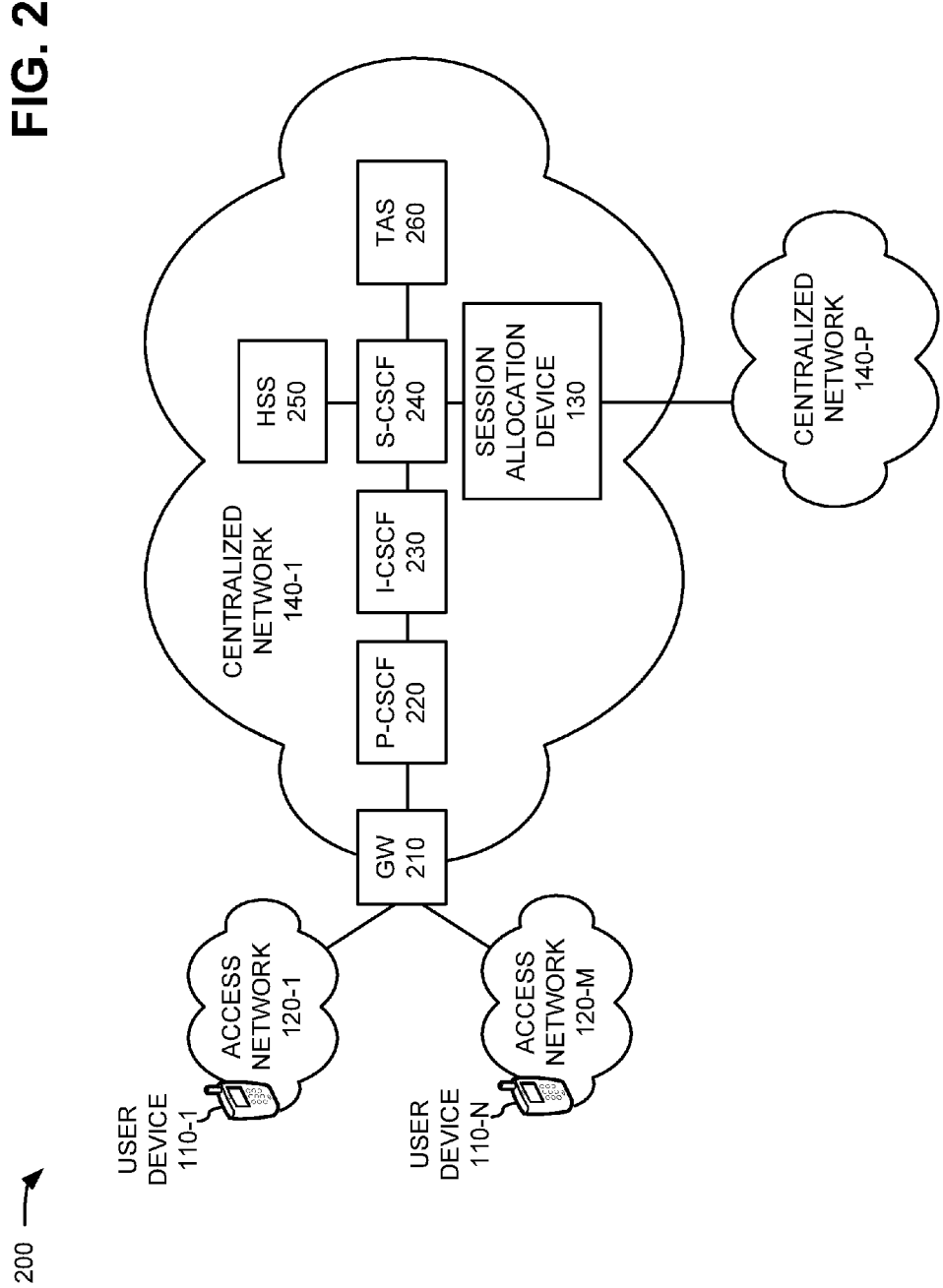
FIG. 2 is a diagram of an example environment in which systems and/or methods, described herein, may be implemented.

FIG. 2 is a diagram of an example environment 200 in which systems and/or methods, described herein, may be implemented. As depicted, environment 200 may include user devices 110, access networks 120, session allocation device 130, centralized networks 140, gateway 210, proxy call session control function (Proxy-CSCF, P-CSCF) device 220, interrogating-CSCF (I-CSCF) device 230, serving-CSCF (S-CSCF) device 240, home subscriber server (HSS) 250, and TAS 260. While FIG. 2 shows a particular number and arrangement of networks and devices, in alternative implementations, environment 200 may include additional networks or devices, fewer networks or devices, different networks or devices, or differently arranged networks or devices than those depicted in FIG. 2.

User devices 110, access networks 120, session allocation device 130, and centralized networks 140 are discussed above with reference to FIG. 1. Gateway 210 may include a variety of computing or communication devices. For example, gateway 210 may include a router, a switch, a hub, or another device capable of providing connectivity, security, and/or data transfer services between networks. As depicted, gateway 210 may provide an interface between access networks 120 and centralized network 140-1. Gateway 210 may also, or alternatively, provide an interface to other networks, such as the Internet. In some implementations, gateway 210 may include a packet data network gateway (PDN gateway, PGW). In some implementations, gateway 210 may not be present.

P-CSCF device 220 may include one or more of a variety of computing devices, such as a computer, a server, a cluster of servers, or one or more other types of computing or communication devices. P-CSCF device 220 may provide a first point of contact for user devices 110 accessing centralized network 140. For example, user device 110 may attach to P-CSCF device 220 prior to registering with centralized network 140-1 and/or initiating a communication session. User device 110 may attach to P-CSCF device 220 by executing one or more proxy device discovery operations.

Similarly, I-CSCF device 230 may include one or more of a variety of computing devices, such as a computer, a server, a cluster of servers, or one or more other types of computing or communication devices. However, by contrast to P-CSCF device 220 providing proxy services for user devices 110, I-CSCF device 230 may provide proxy services for centralized network 140. For example, during the registration of user device 110 with centralized network 140, I-CSCF device 230 may assign or identify a serving control function (e.g., a function of S-CSCF device 240) for serving user device 110 based on subscriber information retrieved from the HSS 250, which may provide for load balancing or other network optimization opportunities within centralized network 140.

S-CSCF device 240 may also include one or more of a variety of computing devices, including a computer, a server, a cluster of servers, or one or more other types of computing or communication devices. S-CSCF device 240 may route communication messages within centralized network 140 and/or establish routing paths for session requests and/or communication sessions. S-CSCF device 240 may also, or alternatively, assist in registering user devices 110 with centralized network 140. While P-CSCF device 220, I-CSCF device 230, and S-CSCF device 240 are depicted as separate devices, in some implementations, the functions of P-CSCF device 220, I-CSCF device 230, and/or S-CSCF device 240 may be implemented in multiple devices or in a single device.

HSS 250 may also include one or more of a variety of computing devices. For example, HSS 250 may include a computer, a server, a cluster of servers, or one or more other types of computing or communication devices. HSS 250 may provide authentication and authorization services with respect to user devices 110. HSS 250 may operate in a control plane of centralized network 140 and may provide a repository of authorizations, service profiles, preferences, and/or policies relating to centralized network 140. For example, HSS 250 may include identifiers of elements serving user devices 110, such as gateways 210, S-CSCF device 240, and/or one or more other devices when user devices 110 are registered.

TAS 260 may also include one or more of a variety of computing devices, including a computer, a server, a cluster of servers, or one or more other types of computing or communication devices. TAS 260 may include a back-to-back SIP user agent capable of maintaining call states. Additionally, or alternatively, TAS 260 may provide telephony services that are not directly related to routing network messages. For example, TAS 260 may provide services, such as call waiting, call forwarding, call conferencing, or other types of services relating to telephony services. In some implementations, TAS may not be present.

Figure 3:
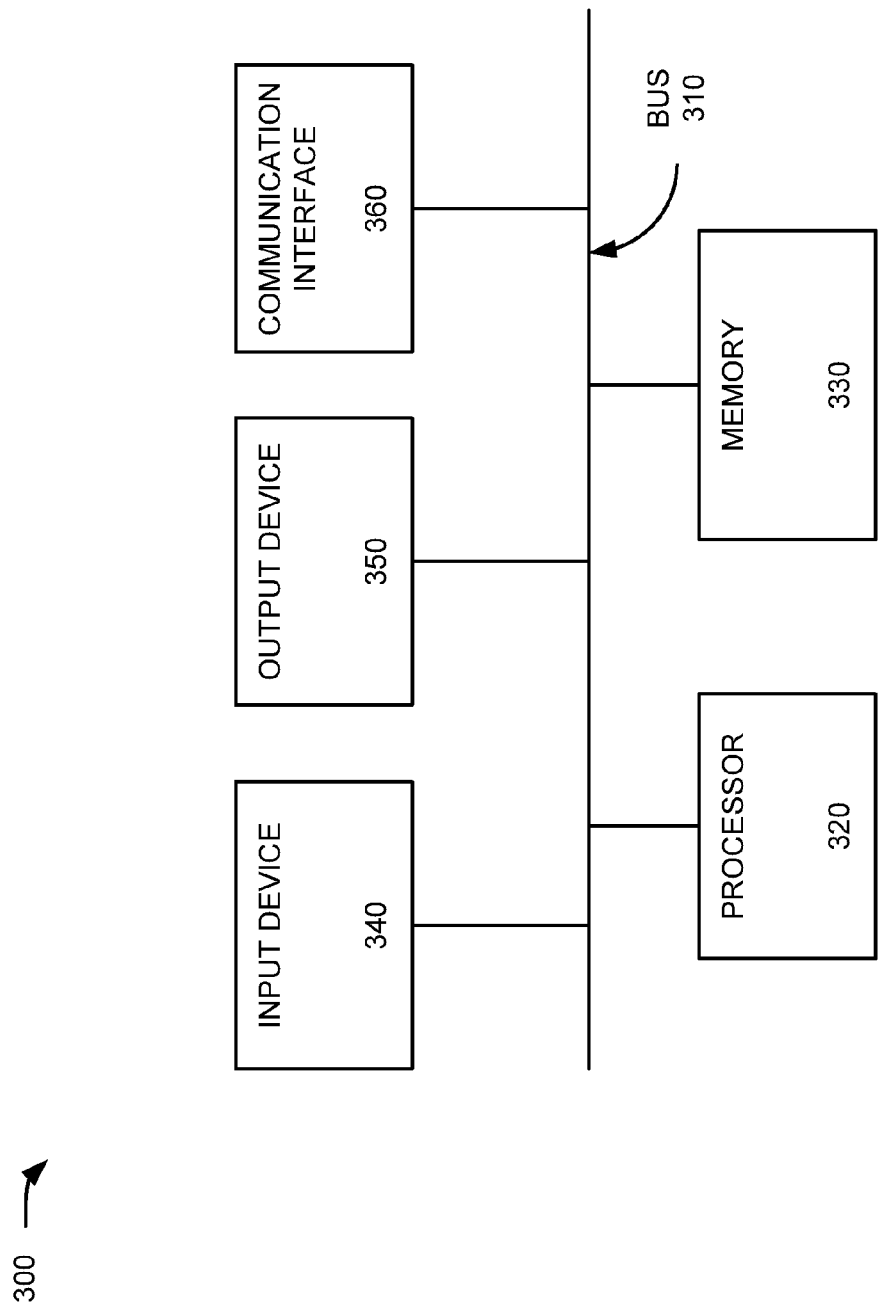
FIG. 3 is a diagram of example components of a device of FIG. 2.

FIG. 3 is a diagram of example components of a device 300 that may operate within the environment of FIG. 2. Device 300 may correspond to user device 110, session allocation device 130, P-CSCF device 220, I-CSCF device 230, S-CSCF device 240, HSS 250, and/or TAS 260. Each of user device 110, session allocation device 130, P-CSCF device 220, I-CSCF device 230, S-CSCF device 240, HSS 250, and/or TAS 260, may include one or more devices 300 or one or more components of device 300.

As depicted in FIG. 3, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths to enable communications among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
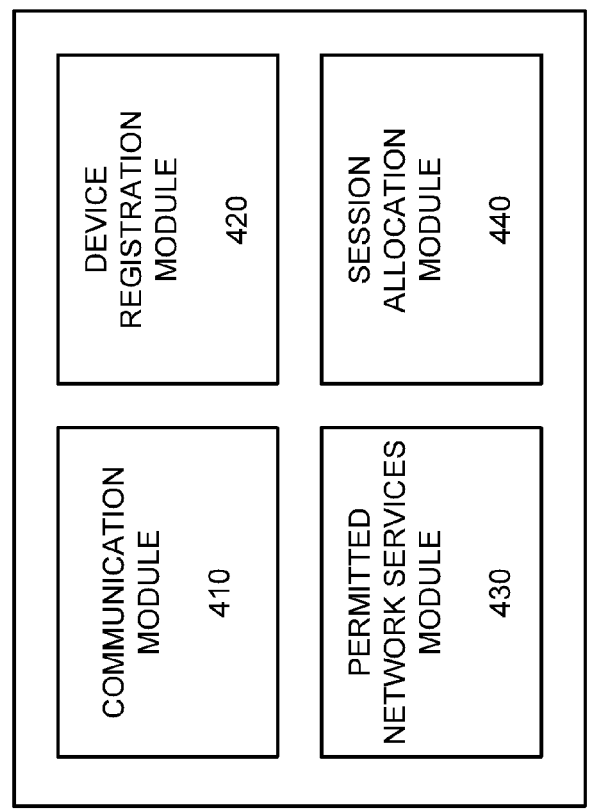
FIG. 4 is a diagram of example functional components of a session allocation device.

FIG. 4 is a diagram of example functional components of session allocation device 130. As depicted, session allocation device 130 may include communication module 410, device registration module 420, permitted network services module 430, and session allocation module 440. Depending on the implementation, one or more of modules 410-440 may be implemented as a combination of hardware and software based on the components illustrated and described with respect to FIG. 3. Alternatively, modules 410-440 may each be implemented as hardware based on the components illustrated and described with respect to FIG. 3. While FIG. 4 shows a particular number and arrangement of modules, in alternative implementations, session allocation device 130 may include additional modules, fewer modules, different modules, or differently arranged modules than those depicted.

Communication module 410 may provide session allocation device 130 with functionality relating to sending and receiving data or other information. For example, communication module 410 may receive registration messages corresponding to user devices 110 registering with centralized network 140. Communication module 410 may also, or alternatively, receive session initiation messages associated with user device 110. Communication module 410 may also, or alternatively, communicate notifications, commands, or instructions to ensure that a communication session is serviced by whichever centralized network 140 is selected by session allocation device 130 to service the communication session.

Device registration module 420 may provide session allocation device 130 with functionality relating to monitoring, verifying, and updating registration information. For example, in response to a registration message indicating that user device 110 registered with centralized network 140, device registration module 420 may create or update a data structure (e.g., a list, a map, a table, a data array, a database, etc.) to indicate or represent a registered status of user device 110 with respect to centralized network 140. Device registration module 420 may also, or alternatively, identify an originating user device 110 and corresponding access network 120 of the registration message, create a data structure associating the originating user device 110 and access network 120, and store the data structure in a memory device. Device registration module 420 may also, or alternatively, update the data structure upon receiving another registration message indicating that user device 110 re-registered with centralized network 140 after switching to a different access network 120 (e.g., an access network of a different access technology).

Device registration module 420 may determine whether user device 110 is registered. For example, in response to a session initiation message associated with user device 110, device registration module 420 may determine whether user device 110 is registered with centralized network 140. In some implementations, device registration module 420 may do so by identifying user device 110 based on the session initiation message, accessing a data structure representing user devices 110 registered with centralized network 140, and/or verifying whether user device 110 is represented in the data structure.

Permitted network services module 430 may provide session allocation device 130 with functionality regarding network service permissions. For example, permitted network services module 430 may maintain a directory or other data structure that associates access networks 120 with services that centralized network 140 is permitted to support. For example, in response to a session invitation message associated with user device 110, permitted network services module 430 may identify user device 110, access network 120, and/or a communication session type associated with the session invitation message. Permitted network services module 430 may also, or alternatively, search an access network service directory, or a functionally similar data structure, to determine whether centralized network 140 is permitted to support the communication service.

In some implementations, centralized network 140 may not be permitted to support a particular communication service type for any access networks 120. However, in other implementations, centralized network 140 may be permitted to support a communication service type for some access networks 120 but not for other access networks 120. Permissions to support one or more communication session types and/or access networks 120 may be a result of a variety of inputs, factors, scenarios, and/or conditions, including network usage, preferences of centralized network operators (e.g., a preference of the operator of centralized network 140), or other types of inputs, factors, scenarios, and/or conditions.

Session allocation module 440 may provide session allocation device 130 with functionality regarding allocating communication sessions to centralized networks 140. For example, session allocation module 440 may select, assign, designate, or otherwise specify that a particular centralized network 140 is to service a communication session based on one or more of a variety of prerequisites, factors, or conditions. For example, if device registration module 420 determines that user device 110 is not registered with one centralized network 140, session allocation module 440 may select another centralized network 140 to service the corresponding communication session. In another example, if permitted network services module 430 determines that a communication session type cannot be supported by one centralized network 140, session allocation module 440 may select another centralized network 140 to support the communication session. Other examples of prerequisites, factors, or conditions corresponding to centralized network 140 servicing a communication session may include a wide variety of additional and/or alternative prerequisites, conditions, and/or scenarios relating to, for example, available network resources, user privileges or authorizations, user devices 110 associated with certain identifiers (e.g., smart phones associated with a particular area code), or other prerequisites, conditions or scenarios relating to communication sessions.

Figure 5:
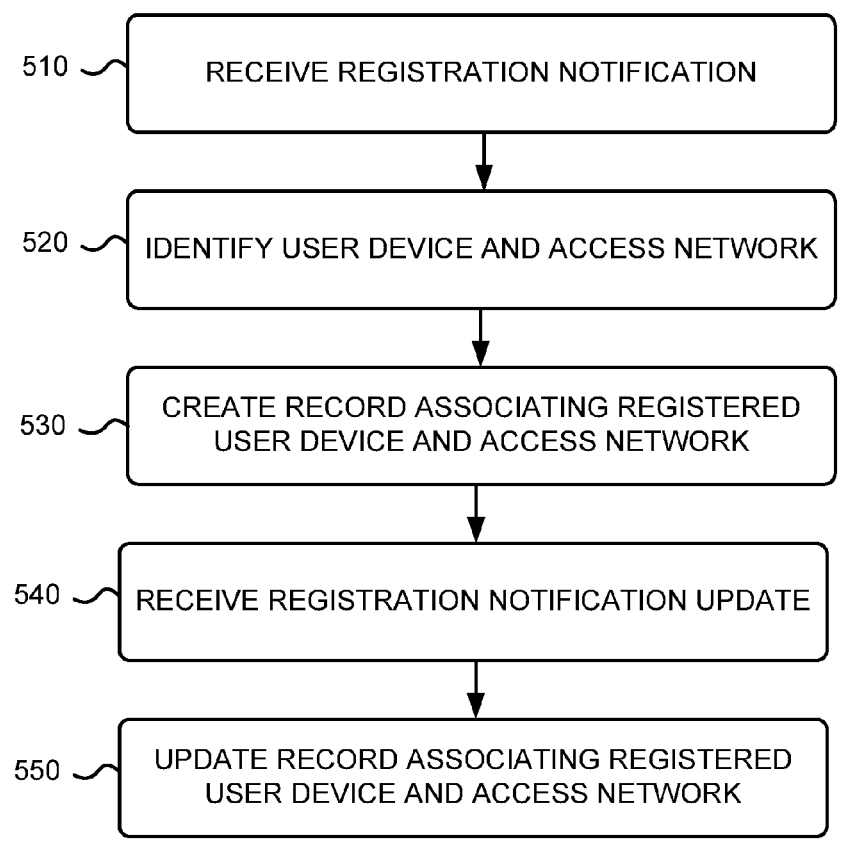
FIG. 5 is a diagram of an example process for registering a user device according to one or more implementations described herein.

FIG. 5 is a diagram of a process 500 for registering a user device according to one or more implementations described herein. In one or more implementations, process 500 may be performed by one or more components of session allocation device 130. In other implementations, one or more blocks of process 500 may be performed by one or more other components/devices, or a group of components/devices, including or excluding session allocation device 130. FIG. 5 will be described below with corresponding references to FIG. 6.

A registration notification may be received (block 510). For example, session allocation device 130 may receive a registration notification corresponding to user device 110 registering with centralized network 140 which may allow allocation device 130 to determine the type of access network 120 serving user device 110 at that time. In some implementations, the registration notification may be implemented as a SIP REGISTER message with the access network type information included in the PANI (P-Access-Network ID) or in a different SIP header such as a new header or a private SIP extension header. The registration notification may be sent by S-CSCF 240 to session allocation device 130 in the same manner that is sent to an application server, such as TAS 260. A registration notification or a third party registration notification may be implemented as a SIP REGISTER just like registration notification. Session allocation device 130 may be implemented as a stand-alone element or as an integrated part of S-CSCF 240 or TAS 260. Functions of session allocation device may be distributed to more than one physical element in some implementations.

User device 110 and access network 120 may be identified (block 520). For instance, session allocation device 130 may identify user device 110 and access network 120 based on a registration notification. In some implementations, user device 110 and access network 120 may be identified based on one or more identities or information included in the registration notification message. In other implementations, user device 110 and access network 120 may be identified with the aid of one or more identification tables, address tables, and/or one or more hierarchal address deduction operations.

A record associating user device 110 with access network 120 may be created (block 530). For example, session allocation device 130 may generate a digital record or other data structure representing a relationship or other type of association between user device 110 and access network 120. In some implementations, the record or data structure may be stored in a memory device.

FIG. 6 is a diagram representing example data structures 600 according to one or more implementations described herein. Data structures 600 include a user device registration directory and a user device and access network directory. As mentioned above, session allocation device 130 may generate a record or other type of data structure (e.g., a list, a map, a table, a data array, a database, etc.) to represent whether a user device 110 is registered to, for example, centralized network 140. Similarly, session allocation device 130 may generate a data structure associating user devices 110 with access networks 120. The information in data structures 600 may be derived from registration messages or notifications corresponding to user device 110 registering with centralized network 140. As discussed below with reference to FIG. 7, collecting this information may play a role in allocating communication sessions to one centralized network 140 instead of another centralized network 140.

Returning to FIG. 5, a registration notification update may be received (block 540). For instance, session allocation device 130 may receive updated registration information regarding user device 110. In some implementations, a registration notification update may be another registration notification (e.g., a third party registration message with PANI header from S-CSCF device 240) corresponding to an already registered user device 110 (see, for example, block 510).

In certain implementations, centralized network 140 may provide services to access networks 120 corresponding to different access technologies. For example, one access network 120 may be an LTE network, while another access network may be an eHRPD network, and yet another access network may be an IEEE 802.11x (or Wi-Fi) network. In such implementations, each time user device 110 attaches to a different access network 120, user device 110 may be required to re-register with centralized network 140 even if both access networks 120 can be, or are, serviced by the same centralized network 140. An example implementation involving user device re-registration is discussed below with reference to FIG. 7.

A record associating a user device 110 and an access network 120 may be updated (block 550). For example, session allocation device 130 may update records or other data structures representing associations between user devices 110 and access networks 120 (see, for example, FIG. 6). In some implementations, this may include accessing a memory device storing the data structures and updating a relevant portion of the data structures with the new information or deleting outdated data structures and generating new data structures representing accurate associations between user device 110 and access networks 120.

While FIG. 5 shows a diagram of an example process 500 for registering a user device, in other implementations, a process for registering a user device may include fewer operations, different operations, differently arranged operations, or additional operations than depicted in FIG. 5.

Figure 7:
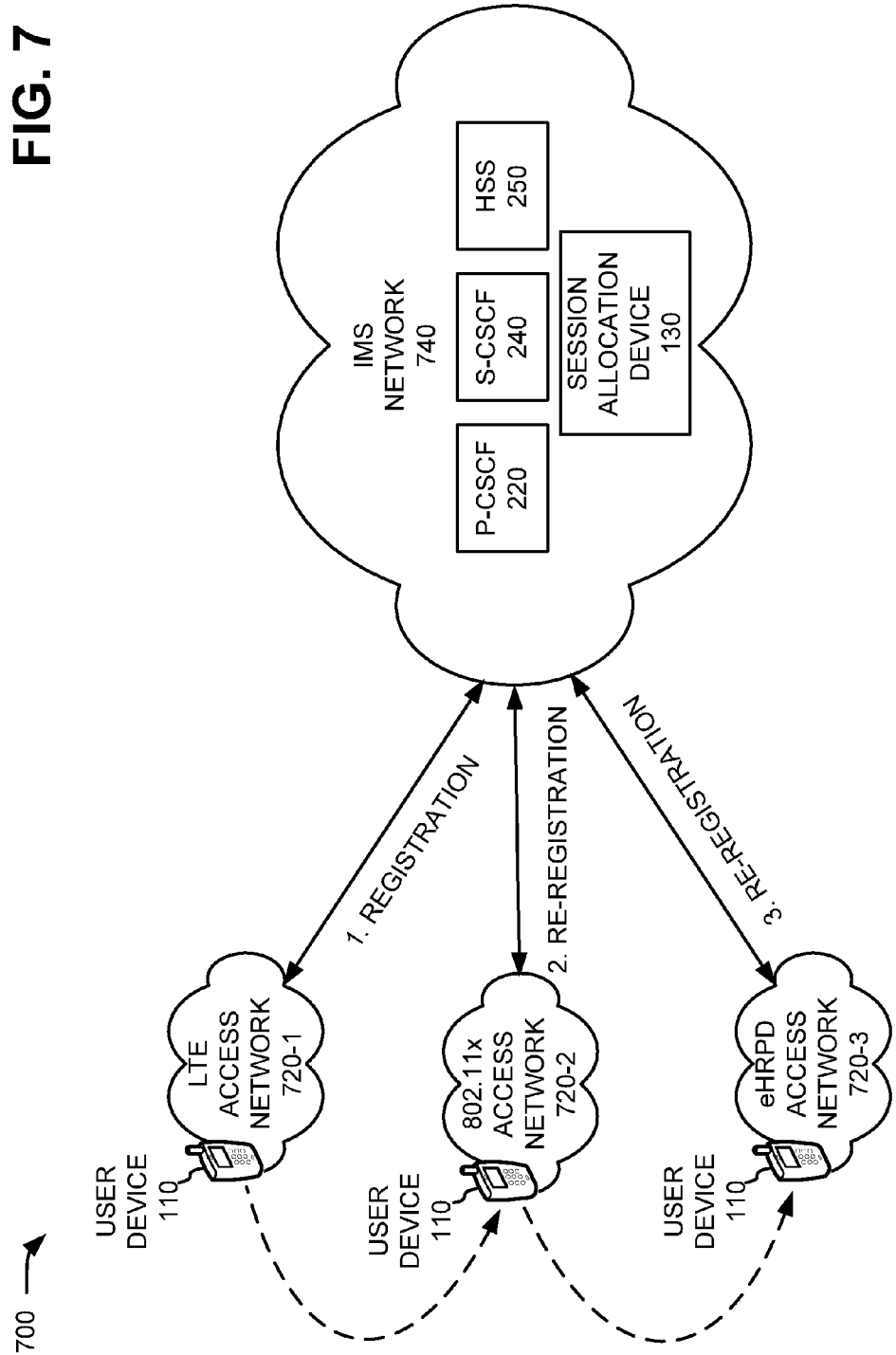
FIG. 7 is a diagram of an example of another process for registering a user device according to one or more implementations described herein.

FIG. 7 is a diagram of an example process 700 for registering user device 110 according to one or more implementations described herein. As depicted, process 700 may include user device 110, LTE access network 720-1, 802.11x access network 720-2, eHRPD access network 720-3, session allocation device 130, P-CSCF device 220, S-CSCF device 240, HSS 250, and IMS network 740. In some implementations, one or more of the processes, systems, or devices of FIG. 7 may correspond to one or more of the processes, systems, or device discussed elsewhere in this specification.

User device 110 may connect or attach to LTE access network 720-1 and register with IMS network 740, which may involve services from P-CSCF device 220, S-CSCF device 240, and HSS 250, as discussed above with reference to FIG. 2. S-CSCF device 240 may send a registration notification to session allocation device 130, indicating that user device 110 has registered with IMS network 740. Based on the notification message, session allocation device 130 may identify user device 110 and LTE access network 720-1, generate a record associating user device 110 and LTE network 720-1, and store the record in a memory or other data repository. As depicted, user device 110 may connect to 802.11x access network 720 at some point after registering with IMS network 740. In some implementations, since user device 110 changed from one access technology (e.g., LTE) to another access technology (e.g., 802.11x), user device 110 may re-register with IMS network 740, resulting in updated registration information being provided to session allocation device 130.

At some point after user device 110 re-registers with IMS network 740, user device 110 may attach to eHRPD access network 720-3, which implements an access technology different from LTE access network 720-1 and 802.11x access network 720-2. As such, in some implementations, user device 110 may again re-register with IMS network 740 even though each of the access networks 720-1, 720-2, and 720-3 are serviced by the same IMS network 740. As described above with respect to the initial registration process, each time user device 110 re-registers with IMS network 740, the information collected and stored by session allocation device 130 may be updated.

Figure 8:
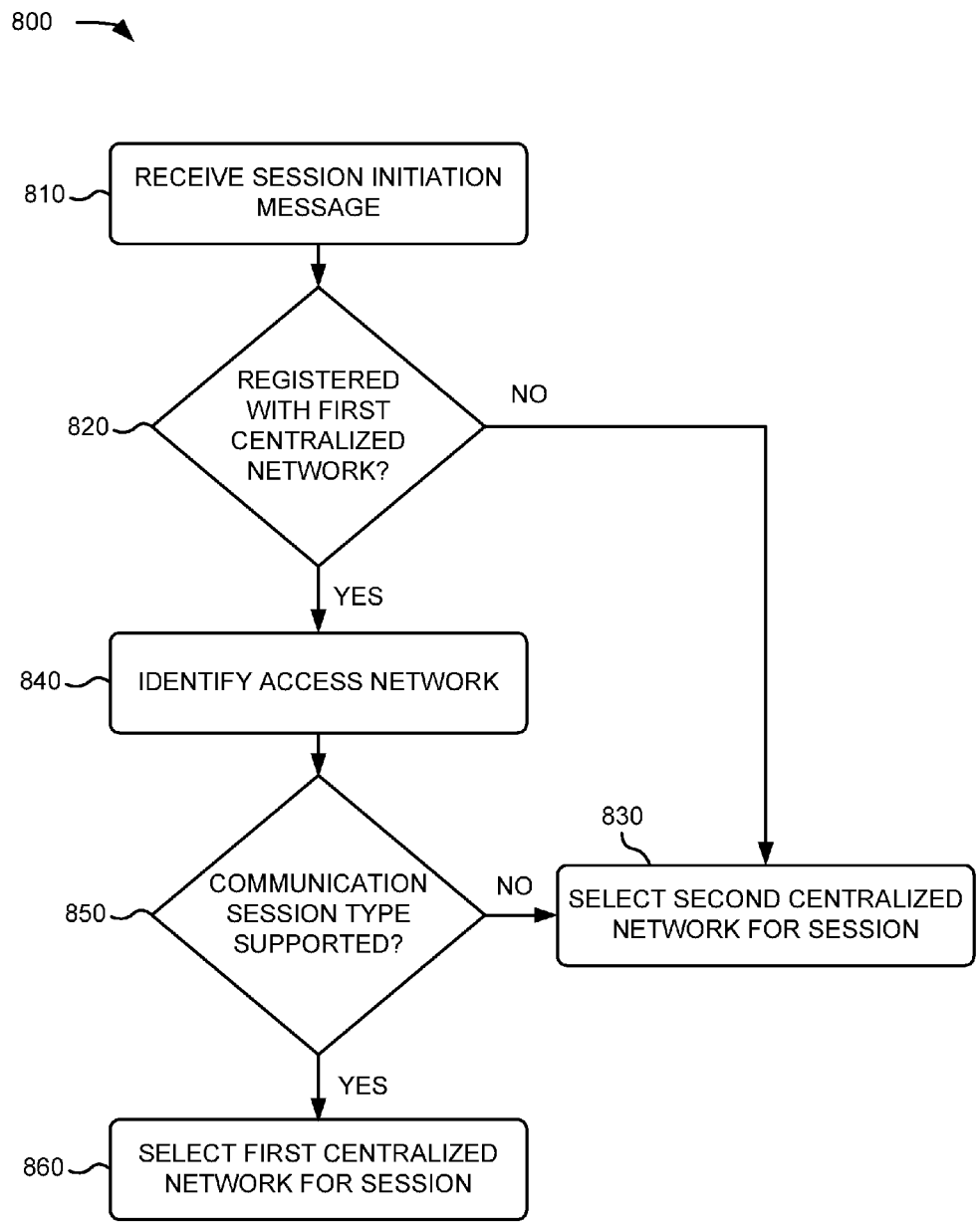
FIG. 8 is a diagram of a process for allocating a communication session according to one or more implementations described herein.

FIG. 8 is a diagram of a process 800 for allocating a communication session to centralized network 140 according to one or more implementations described herein. In one or more implementations, process 800 may be performed by one or more components of session allocation device 130. In other implementations, one or more blocks of process 800 may be performed by one or more other components/devices, or a group of components/devices, including or excluding session allocation device 130.

FIG. 8 will be described with corresponding references to FIGS. 9A-9C. The data structures of FIGS. 9A-9B were initially presented in FIG. 6 within the context of monitoring registered devices and associations between user devices 110 and access networks 120. However, the data structures are again presented in FIGS. 9A-9B to facilitate a description of how the data structures may be used in allocating communication sessions.

Referring to FIG. 8, a session initiation message may be received (block 810). For example, a session allocation device 130 may receive a session initiation message associated with user device 110. In some implementations, user device 110 may be connected to access network 120, and/or the session initiation message may include a request for services corresponding to a communication session type (e.g., VoIP services).

A determination may be made whether user device 110 is registered (block 820). For instance, session allocation device 130 may determine whether user device 110 is registered with centralized network 140. In certain implementations, session allocation device 130 may do so based on the session invitation message (e.g., by locating an identifier associated with user device 110 in the session invitation message). In certain implementations, session allocation device 130 may communicate with another network device, such as HSS 250 to determine whether user device 110 is registered. In some implementations, session allocation device 130 may also, or alternatively, access a directory of registered user devices that is stored and maintained by session allocation device 130.

FIG. 9A is a diagram representing example data structure 900A according to one or more implementations described herein. As depicted, data structure 900A may include a directory with a column of user device identifiers and a corresponding column or registration statuses. In some implementations, session allocation device 130 may determine whether user device 110 is registered by, for example, obtaining an identifier of user device 110 in a session initiation message and querying data structure 900A to determine if user device 110 is registered.

Returning to FIG. 8, a second centralized network 140 may be selected for a communication session (block 830). For example, session allocation device 130 may select second centralized network 140 for servicing a communication session. In some implementations, session allocation device 130 may select second centralized network 140 in response to user device 110 not being registered with first centralized network 140 (e.g., not being in the domain of first centralized network 140) (block 820—No). An example of a first centralized network may include an IMS network, and an example of a second centralized network may include a CDMA network.

An access network 120 may be identified (block 840). For example, session allocation device 130 may identify access network 120 associated with a session initiation message or incoming call. In some implementations, session allocation device 130 may identify access network 120 in response to a determination that the corresponding user device 110 is registered with first centralized network 140 (block 820—Yes). As mentioned above, user device 110 and access network 120 may be identified based on one or more identifiers included in the registration notification message (see, for example, blocks 510-520 of FIG. 5). In some implementations, the identities may be stored by session allocation device 130.

FIG. 9B is a diagram representing example data structure 900B according to one or more implementations described herein. As depicted, data structure 900B may include a directory associating user devices 110 with access networks 120. As mentioned previously, session allocation device 130 may identify associations between user devices 110 and access networks 129 based on user device registration messages. For example, session allocation device 130 may locate an identifier of user device 110 in a session initiation message, access data structure 900B, and identify which access network 120 is associated with user device 110 based on data structure 900B.

Returning to FIG. 8, a determination may be made regarding whether a communication session type is supported (block 850). For example, session allocation device 130 may determine whether centralized network 140 is permitted to support a particular communication session type of access network 120. In some implementations, this may include accessing a locally stored data structure (e.g., a list, a map, a table, a data array, a database, etc.) that associates access networks with supported communication services.

FIG. 9C is a diagram representing example data structure 900C according to one or more implementations described herein. Data structure 900C may include an access network services directory that indicates services that centralized network 140 is permitted to support for each access network 120. Session allocation device 130 may determine whether centralized network 140 is permitted to support a particular communication session type by, for example, locating an identifier of user device 110 in a session initiation message, accessing data structure 900B to identify which access network 120 is associated with user device 110, and determining whether a communication session type, associated with the session initiation message, is permitted based on data structure 900C.

While the information for data structures 900A and 900B, as discussed above, may be collected when user device 110 registers with centralized network 140, the information for data structure 900C may come from one or more other sources, such as an operator of centralized network 140.

Returning to FIG. 8, a second centralized network 140 may be selected for a communication session (block 830). In some implementations, session allocation device 130 may select second centralized network 140 when a communication session type is not supported by first centralized network 140 (block 850—No). By contrast, when a communication session type is supported by first centralized network 140 (block 850—Yes), first centralized network 140 may be selected to service the corresponding communication session (block 860).

While FIG. 8 shows a flowchart diagram of an example process 800 for registering a user device, in other implementations, a process for registering a user device may include fewer operations, different operations, differently arranged operations, or additional operations than depicted in FIG. 8.

FIG. 10 is a diagram of another example process 1000 for allocating a communication session according to one or more implementations described herein. In one or more implementations, process 1000 may be performed by one or more components of session allocation device 130. In other implementations, one or more blocks of process 1000 may be performed by one or more other components/devices, or a group of components/devices, including or excluding session allocation device 130.

Process 1000 may include receiving an incoming call for user device 110 (block 1010). As depicted, the incoming call may be received from S-CSCF device 240 of IMS network 740 (FIG. 7). The incoming call may be received after user device 110 has been registered and/or authenticated by IMS network 740 (e.g., centralized network 140-1).

A determination may be made whether user device 110 is in a domain of IMS network 740 (block 1020). In some implementations, user device 110 is in the domain of IMS network 740 if user device 110 has registered with IMS network 740. As depicted, a CDMA network (e.g., centralized network 140-P) may be selected for the call (block 1030) if user device 110 is not registered with IMS network 740 (block 1020—No). However, if user device 110 is registered to the domain of IMS network 740 (block 1020—Yes), a second determination may be made regarding whether user device 110 is in an LTE access network 720-1 or an eHRPD access network 720-3 (block 1040).

In the depicted example, if user device 110 is in LTE access network 720-1 (block 1040—LTE), a determination may be made whether IMS network 740 will support (or is permitted to support) VoIP services in LTE access network 720-1 (block 1050). However, if user device 110 is in eHRPD access network 720-3 (block 140—eHRPD), a determination may be made whether IMS network 740 will support (or is permitted to support) VoIP services in eHRPD access network 720-3 (block 1060). For each access network (LTE and eHRPD) 720-1 and 720-3, if VoIP is not supported (e.g., permitted) (block 1050—No, and block 1060—No), the incoming call may be sent to a CDMA network (blocks 1030 and 1070). Conversely, for each access network (LTE and eHRPD) 720-1 and 720-3, if VoIP is supported (e.g., permitted) (block 1050—Yes, and block 1060—Yes), the incoming call may be sent to and serviced by IMS network 740 (block 1080).

Furthermore, when there is no centralized network 140 available that can support a service, then the service request may be denied. Using the last example, when a user device 110 only has access to, for instance, eHRPD at the time that an incoming VoIP call arrives for user device 110, and a VoIP call is not permitted to be delivered to access network eHPRD, then the incoming call may not be offered to the user device 110 and may be rejected or forwarded to voice mail or other destination. Similarly, if a user device 110 is at an active VoIP call in, for example a LTE access network and moves into an eHRPD access network by performing a handoff, session allocation device 130 may decide to disconnect the call because the new access network 120 does not support the current service.

While FIG. 10 shows a flowchart diagram of an example process 1000 for allocating a communication session, in other implementations, a process for allocating a communication session may include fewer operations, different operations, differently arranged operations, or additional operations than depicted in FIG. 10.

In one or more implementations, described herein, devices may be used to allocate communication sessions to different networks. For example, session allocation device 130 may receive a session initiation message associated with user device 110 connected to access network 120. The session initiation message may correspond to a communication session type, such as a VoIP communication session. Session allocation device 130 may select one centralized network 140 from a group of centralized networks 140 to service the corresponding communication session based on one or more factors, such as whether user device 110 is registered, which access network 120 user device 110 is attached to, whether the communication session type is permitted, or other criteria relating to communication services.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, comprising:
receiving a session initiation message associated with a user device connected to a first access network, the session initiation message corresponding to a communication service type wherein the first access network enables the user device to obtain, via the device, communication services from at least one of a first centralized network or a second centralized network, and the first centralized network is configured to provide at least one of the communication services and the second centralized network is configured to provide at least one of the communication services;
determining whether the user device is registered with the first centralized network based on the session initiation message;
in response to determining that the user device is registered with the first centralized network, identifying the first access network and determining whether the first centralized network supports the communication service type in the first access network;
in response to determining that the first centralized network supports the communication service type in the first access network, designating the first centralized network to service a communication session associated with the session initiation message;
in response to determining that the first centralized network does not support the communication service type in the first access network and the second centralized network supports the communication service type in the first access network, designating the second centralized network to service the communication session associated with the session initiation message; and
in response to determining that the user device is not registered with the first centralized network, designating the second centralized network to service the communication session;
transitioning the user device from the first access network to a second access network, wherein the first access network corresponds to a first access technology and the second access network corresponds to a second access technology that is different from the first access technology;
receiving a registration message associated with the user device registering with the first centralized network;
identifying the user device and the second access network based on the registration message;
deleting a first data structure in which the user device is associated with the first access network; and
creating a second data structure in which the user device is associated with the second access network.

2. The method of claim 1, where determining whether the user device is registered comprises:
identifying the user device based on the session initiation message;
accessing a data structure identifying user devices registered with the first centralized network; and
verifying whether the user device is identified in the data structure.

3. The method of claim 1, further comprising:
receiving, prior to receiving the registration message, another registration message corresponding to the user device registering with the first centralized network;
identifying the user device and the first access network based on the other registration message; and
creating the first data structure in which the user device is associated with the first access network.

4. The method of claim 1, where determining whether the first centralized network supports the communication service type in the first access network comprises:
accessing a data structure associated with the first access network, the data structure representing communication service types specified by an operator of the first centralized network, and
determining whether the communication service type, corresponding to the session initiation message, matches any of the specified communication service types associated with the first access network.

5. The method of claim 1, where:
the first centralized network is a next generation network (NGN);
the second centralized network is a legacy network; and
the communication service type comprises voice over Internet Protocol (VoIP).

6. The method of claim 1, where the first access network comprises a Long-Term Evolution (LTE) network, an evolved high rate packet data (eHRPD) network, a code division multiple access (CDMA) network, a Wi-Fi network, a worldwide interoperability for microwave access (WiMax) network; a digital subscriber line (DSL) network, or a satellite network.

7. A network device, comprising:
a memory to store instructions; and
a processor, connected to the memory, to:
receive an incoming call, for a user device, requesting a communication session corresponding to a communication service type,
identify a first access network connected to the user device, wherein the first access network enables the user device to obtain, via the network device, communication services from at least one of a first centralized network or a second centralized network, and the first centralized network is configured to provide at least one of the communication services and the second centralized network is configured to provide at least one of the communication services, determine whether the user device is registered with the first centralized network based on the incoming call, determine whether the first centralized network supports the communication service type in the first access network, in response to determining that the user device is registered with the first centralized network based on the incoming call, and the first centralized network supports the communication service type in the first access network, designate the first centralized network to service the communication session to the user device via the first access network, and in response to determining that the first centralized network does not support the communication service type in the first access network and the second centralized network supports the communication service type in the first access network, designate the second centralized network to service the communication session to the user device via the first access network, where the first centralized network and the second centralized network are different networks, transition the user device from the first access network to a second access network, where the first access network corresponds to a first access technology and the second access network corresponds to a second access technology that is different from the first access technology, receive a registration message associated with the user device registering with the first centralized network, identify the user device and the second access network based on the registration message, and update a data structure in which the user device is associated with the first access network to associate the user device with the second access network.

8. The network device of claim 7, where the processor is to:

in response to determining that the user device is not registered with the first centralized network based on the incoming call, designate the second or a third centralized network to service the communication session.

9. The network device of claim 1, where, to determine whether the user device is registered, the processor is to:

identify the user device based on the incoming call, access a record of user devices registered with the first centralized network, and verify whether the user device is represented in the accessed record.

10. The network device of claim 7, where the processor is to:

receive, prior to receiving the registration message, an other registration notification of registering the user device with the first centralized network, identify the first access network to which the user device is connected based on the other registration notification, and store the data structure in which the user device is associated with the first access network, where the data structure is used to identify the first access network based on the incoming call.

11. The network device of claim 7, where, to determine whether the first centralized network supports the communication service type in the first access network, the processor is to:

access a data structure in which each of plurality of access networks is associated with communication service types permitted in each access network, wherein the permitted communication service types are specified by an operator of the first centralized network, wherein the first access network is among the plurality of access networks, and determine whether the communication service type corresponding to the incoming call matches any of specified communication service types associated with the first access network.

12. The network device of claim 7, where:

first centralized network is a next generation network (NGN);

the second centralized network is a legacy network; and the communication service type comprises voice over Internet Protocol (VoIP).

13. The network device of claim 7, where the first access network comprises a Long-Turn Evolution (LTE) network, an evolved high rate packet data (eHRPD) network, a code division multiple access (CDMA) network, a Wi-Fi network, a worldwide interoperability for microwave access (WiMax) network, a digital subscriber line (DSL) network, Or as satellite network.

14. A non-transitory computer-readable medium storing a program for causing a device to perform a method, the method comprising:

receiving a first registration message corresponding to a user device registering with a first centralized network;

identifying the user device and a first access network associated with the user device, based on the first registration message, wherein the first access network enables the user device to obtain, via the device, communication services from at least one of a first centralized network or a second centralized network, and the first centralized network is configured to provide at least one of the communication services and the second centralized network is configured to provide at least one of the communication services;

creating a data structure indicating a registration status of the user device and association of the user device with the first access network;

connecting the user device to a second access network, where the first access network corresponds to an access technology that is different from an access technology of the second access network;

receiving a second registration message corresponding to the user device re-registering with the first centralized network;

identifying the user device and the second access network based on the second registration message, and updating the data structure to associate the user device with the second access network and to remove the association of the user device with the first access network.

15. The non-transitory computer-readable medium of claim 14, where the method further comprises:

receiving a session initiation message associated with the user device, the session initiation message corresponding to a communication service type;

determining whether the first centralized network supports the communication service type in the second access network, in response to determining that the first centralized network supports the communication service type in the second access network, designating the first centralized network to service a communication session corresponding to the session initiation message, and in response to determining that the first centralized network does not support the communication service type in the second access network, designating the second centralized network to service the communication session corresponding to the session initiation message.

16. The non-transitory computer-readable medium of claim 15, where the method further comprises:

verifying that the user device is registered with the first centralized network based on the session initiation message and the data structure.

17. The non-transitory computer-readable medium of claim 15, where determining whether the first centralized network supports the communication service type in the second access network comprises:

accessing a data structure in which each of a plurality of access networks is associated with communication service types permitted in each access network, wherein the permitted communication service types are specified by an operator of the first centralized network, and determining whether the communication service type corresponding to the session initiation message matches any of the permitted communication service types associated with the second access network.

18. The non-transitory computer-readable medium of claim 15, where:

the first Centralized network is a next generation network (NGN), the second centralized network is a legacy network, and the communication service type comprises voice over Internet Protocol (VoIP).

* * * * *